United States Patent [19]
Murphy et al.

[11] Patent Number: 5,896,105
[45] Date of Patent: Apr. 20, 1999

[54] DISTRIBUTED PHASED ARRAY ANTENNA SYSTEM

[75] Inventors: John H. Murphy; Laurence E. Kline; Harvey C. Nathanson, all of Pittsburgh, Pa.; Harry V. Winsor, Catonsville, Md.

[73] Assignee: Northrop Grumman Corporation, Los Angeles, Calif.

[21] Appl. No.: 08/880,703

[22] Filed: Jun. 23, 1997

[51] Int. Cl.⁶ ................................................. H04B 7/185
[52] U.S. Cl. ................................. 342/368; 342/357
[58] Field of Search ................................ 342/357, 368

[56] References Cited

U.S. PATENT DOCUMENTS

| | | | |
|---|---|---|---|
| 4,589,100 | 5/1986 | Savit | 367/77 |
| 4,843,397 | 6/1989 | Galati et al. | 342/368 X |
| 5,192,921 | 3/1993 | Chantry et al. | |
| 5,327,105 | 7/1994 | Liberman et al. | |
| 5,767,804 | 6/1998 | Murphy | 342/357 |

OTHER PUBLICATIONS

"Microwave Imaging of Aircraft", *Proceedings Of The IEEE*, vol. 76, No. 12, Dec., 1988, Bernard D. Steinberg, pp. 1578–1592.

"Improved Adaptive-Beamforming Target for Self-Calibrating a Distorted Phased Array", *IEEE Transactions On Antennas And Propagation*, vol. 38, No. 2, Feb., 1990, Bongsoon Kang, Harish M. Subbaram and Bernard D. Steinberg, pp. 186–194.

"The Peak Sidelobe of the Phased Array Having Randomly Located Elements", *IEEE Transactions On Antennas And Propagation*, vol. AP–20, No. 2, Mar., 1972, Bernard D. Steinberg, pp. 129–136.

*Primary Examiner*—Mark Hellner
*Attorney, Agent, or Firm*—Walter G. Sutcliff

[57] ABSTRACT

An array of individual and autonomous modules are deployed in a region to be surveilled. Each module, contained in an air dropable bomblet, includes a GPS system for determining the exact location of the deployed module. The module also includes an rf receiver and transmitter, as well as an atomic clock circuit for providing highly precise time and clocking signals, with operation of the module circuitry being governed by a control computer. The computers of the modules are individually programmed such that the modules of the array collectively operate as a distributed phased array antenna system, but without any hardwired interconnection between the modules. In another embodiment a single receiver is utilized and the apparatus operates on the frequency set of the GPS system.

14 Claims, 15 Drawing Sheets

DISTRIBUTED PHASED ARRAY ANTENNA SYSTEM

BACKGROUND OF THE INVENTION

1. Field of the Invention

The invention in general relates to a distributed phased array antenna arrangement and more particularly to a randomly distributed array for battlefield surveillance and rf counter measures.

2. Description of the Related Art

In a tactical warfare situation it is often desired to conduct a surveillance of a region so as to detect and neutralize the land or air weapons of an enemy. Large scale phased array radar systems are tools which fulfill these requirements however, under certain battlefield conditions it is impractical to deploy large detection equipment into a zone for this purpose because of their vulnerability to detection and denial.

Further, during various operations it would be desirable for friendly forces to communicate results of battlefield surveillance with one another without revealing the exact location of the transmitters to an enemy. Spread spectrum communication systems are often used for this purpose.

The present invention provides for a distributed phased array antenna system which can be deployed in a relatively covert manner to accomplish the above objectives, with minimal chance of being detected.

SUMMARY OF THE INVENTION

A distributed phased array antenna system is provided having an array of autonomous modules for deployment in a region to be surveilled. Each of the autonomous modules includes, in addition to an individual power supply, a transmitter and receiver for radio frequency (rf) signals as well as a separate receiver for receiving signals from a satellite navigation positioning system such as the global positioning system (GPS) and in response to these latter signals, generating a time signal as well as position signals indicative of the exact location of the module. In an alternate embodiment only a single receiver is used, a GPS receiver, and the transmitter is operable to transmit signals using the frequency set of the GPS system.

Each module additionally includes an atomic clock circuit having an atomic clock oscillator operable to provide a stable phase and precise frequency clock signal. The atomic clock circuit is also operable to provide a reference time signal used by the module, in place of the time signal derived from the GPS satellite system.

Within the module is a computer and associated memory which stores operational commands as well as the module's unique ID and indications of received rf signals, with the computer being operable to execute the operational commands and to perform predetermined computations for governing operation of the module.

Rf and GPS signals are received, and rf signals are transmitted, by means of an antenna unit which may be constituted by separate or combined GPS and rf antennas.

In an intended operation, the modules may be contained in respective bomblets which are deployed from an aircraft into the region to be surveilled.

DESCRIPTION OF THE PREFERRED EMBODIMENTS

Figure 1:
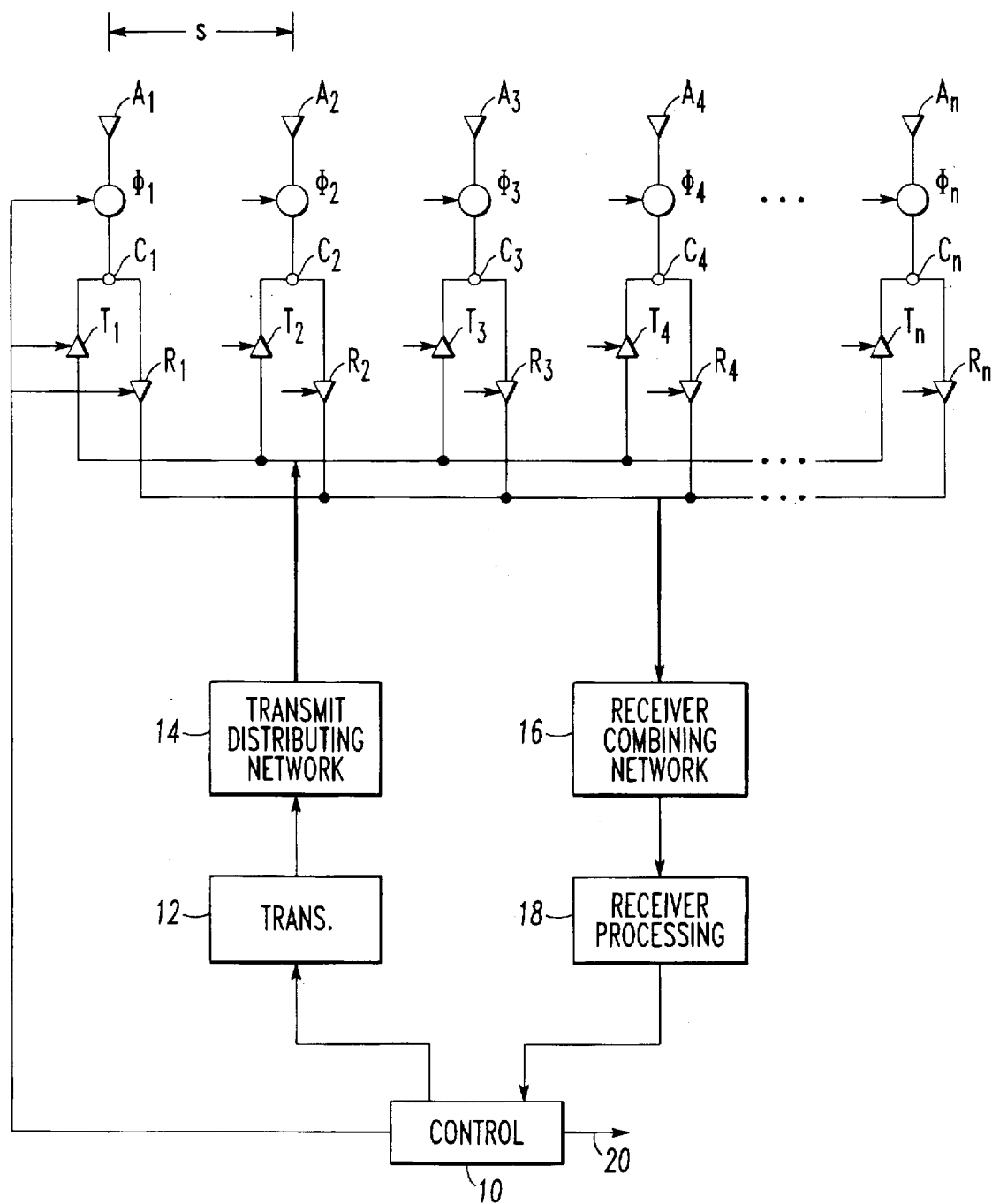
FIG. 1 is a basic block diagram of a typical phased array antenna system.

In the drawings, which are not necessarily to scale, like or corresponding parts are denoted by like or corresponding reference numerals.

A typical phased array antenna system forms a beam by assigning phases to a number of separate antenna elements. The phase as well as the amplitude of an antenna signal is electronically governed by a central control thus narrowing the breadth of the beam, allowing the beam to point in a certain desired direction and even allowing the formation of multiple simultaneous beams in a variety of desired directions.

FIG. 1 basically illustrates one type of phased array antenna system in common use. The array includes a plurality of antenna elements $A_1$ to $A_n$, spaced from one another by a distance s, with each having an associated phase shifter $\Phi_1$ to $\Phi_n$, although electronically controllable time delay circuits may also be utilized. Coupled to the antenna circuits are respective circulators $C_1$ to $C_n$ for directing transmitter signals from controllable transmitter amplifiers $T_1$ to $T_n$ to the antenna elements, and directing received signals from the antenna elements to controllable receive amplifiers $R_1$ to $R_n$, such controllable amplifiers being operable to impart a desired weighting or shaping function to the combined signals of the array. The magnitude of any applied phase shifting and amplification is governed by a single central control computer 10.

A signal to be transmitted is provided by transmitter 12 to a transmitter distributing network 14 which collectively applies the signal to all of the antenna elements via amplifiers $T_1$ to $T_n$ and phase shifters $\Phi_1$ to $\Phi_n$. In a like arrangement, received signals from phase shifters $\Phi_1$ to $\Phi_n$ and receive amplifiers $R_1$ to $R_n$ are collectively provided to a receiver combining network 16 whereby the received signal may be processed in receiver processing circuit 18 to derive desired information.

The output of receiver processing circuit 18 may be further processed in central control computer 10 for control or other purposes, as indicated by output arrow 20.

Figure 2A:
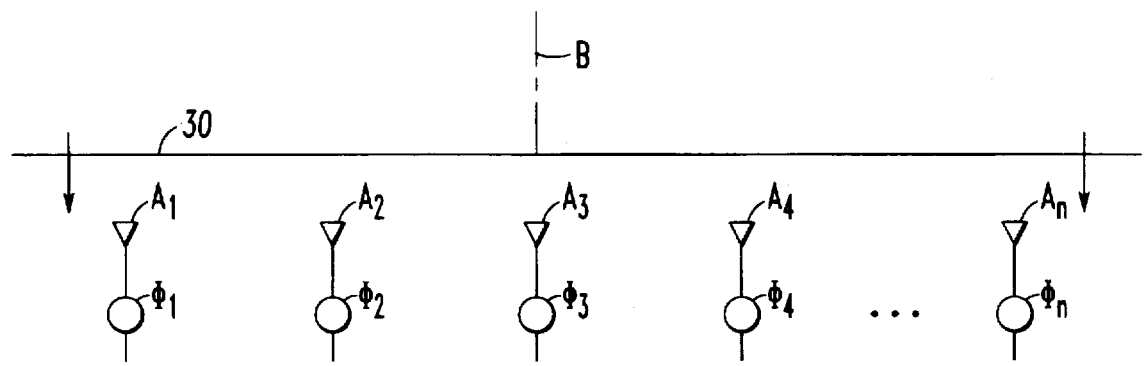
FIGS. 2A to 2C illustrate the positioning of antenna elements relative to signal phase front.
Figure 2B:
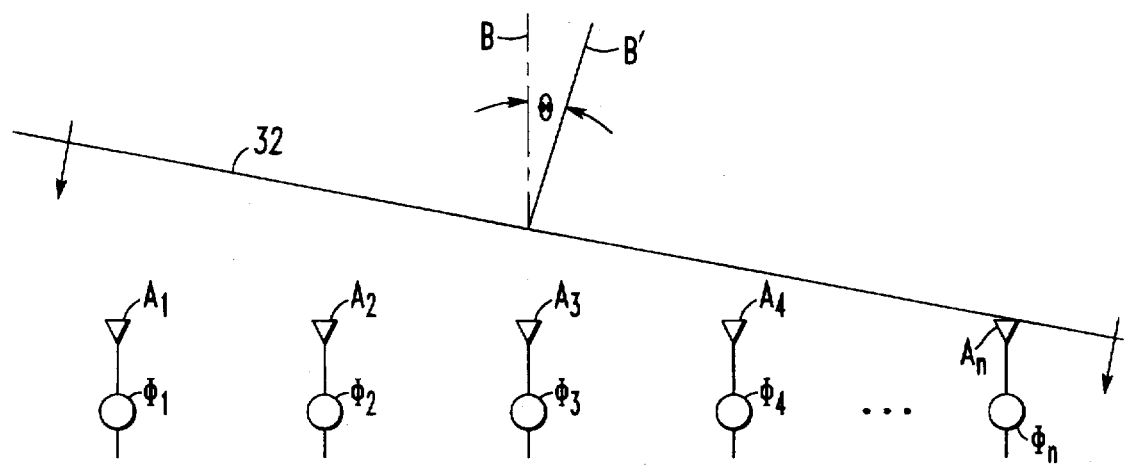
Figure 2C:
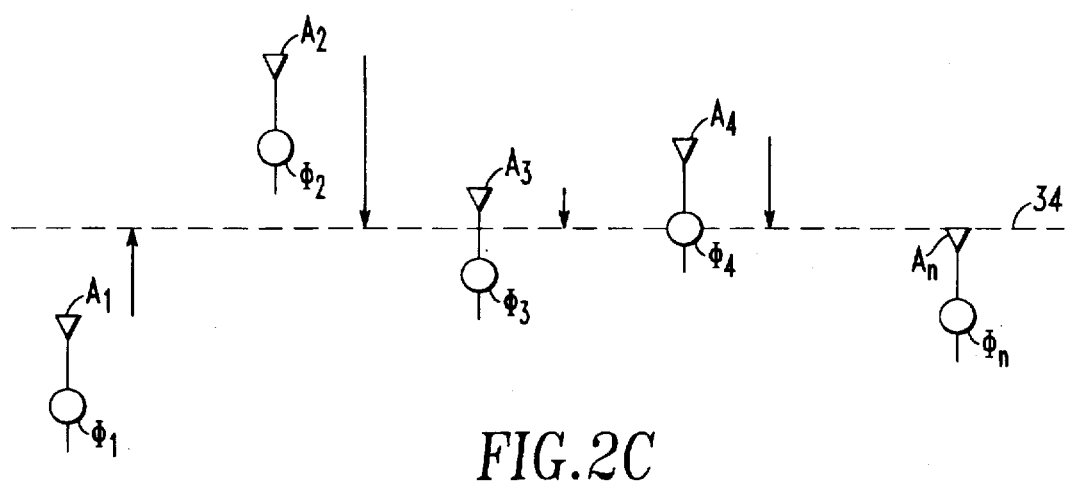

Although line arrays of antenna elements are illustrated in FIGS. 2A to 2C, the principles described herein equally apply to an array wherein the beam is capable of being steered in two dimensions.

In FIG. 2A, numeral 30 represents a uniphase front of an incoming signal and it is seen that the phase front will impinge upon all of the antenna elements $A_1$ to $A_n$ at the same time and a receiver beam will be formed perpendicular to the array along a boresite B. In this instance the phase delays of phase shifters $\Phi_1$ to $\Phi_n$ are all the same, preferably set to zero.

If various signal delays or phase shifts are applied to the respective antenna elements $A_1$ to $A_n$, a beam may be processed which is pointed in another direction. For example, in FIG. 2B a uniphase front 32 is illustrated as initially exciting end element $A_n$. By applying appropriate phase shifts to the antenna elements $A_1$ to $A_n$, a beam may be formed which points at an angle $\theta$ along line B' relative to boresite B.

The phase shifting principles for beam formation by phase shifting apply not only to a well defined linear (or two or three dimensional) array, but equally apply to a random array, such as shown in FIG. 2C. That is, by applying the appropriate phase shift to the respective antenna elements $A_1$ to $A_n$ they may appear to lie, in effect, along a desired reference line 34.

The antenna element spacing s is generally equal to or less than $\lambda/2$, where $\lambda$ is the operating wavelength of the rf signal. In instances where s is greater than $\lambda/2$, undesired grating sidelobes are produced. For very large arrays precise spatial positioning or alignment of the antenna elements becomes increasingly difficult. In addition, the large number of elements required for a "filled" array where $s \leq \lambda/2$, significantly adds to the cost of the overall system. Accordingly, a large cost reduction may be achieved by using a "thinned" or sparse array. It has been shown that a randomly distributed array with antenna element spacing much greater than $\lambda/2$ can perform as an effective system by applying various well known adaptive beamforming algorithms.

Figure 3:
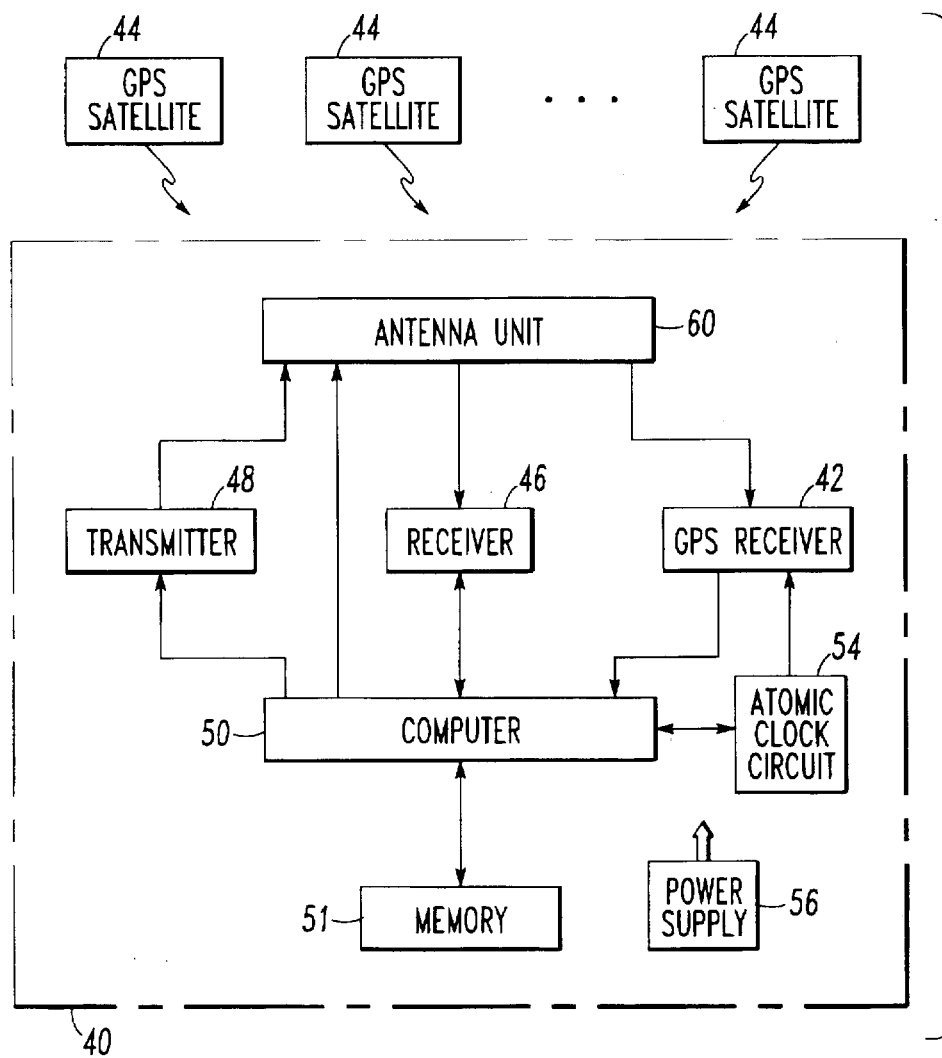
FIG. 3 is a block diagram of a module in accordance with one embodiment of the invention.

In the present invention each individual antenna element is contained in its own autonomous module, along with associated electronics, with the totality of modules constituting an array being dispersed over an area to form a distributed phased array antenna system. FIG. 3 illustrates one embodiment of such a module.

Module 40 includes a first receiver 42 which is operable to receive rf signals from a satellite navigation positioning system and, in response thereto, provide a synchronous time signal as well as signals indicative of the exact location of the module 40. A popular location system in wide use is the Global Positioning System (GPS) which utilizes a constellation of 24 satellites in nominally 12 hour orbits around the earth such that a satellite passes over the same location on earth every day. This particular orbital configuration and number of satellites allows a user at any unobstructed location on the earth to have at least four satellites in view 24 hours a day.

In FIG. 3 each satellite 44 of the GPS constellation is equipped with atomic clocks and circuitry for continuously transmitting accurate time, satellite position and satellite status information utilizing at least one of two different carrier frequencies. By comparing the signals from at least four satellites, the receiver 42 can determine its precise location 24 hours a day, and can provide higher accuracy time and position information if all satellites in view are used.

Module 40 additionally includes a second receiver 46 for receiving rf signals, and a transmitter 48 for transmitting rf signals. A computer 50 is operable, inter alia, to execute operational commands, perform certain computations and to control the gain and phase shifting of the transmitted and received sets of rf signals. Associated with the computer 50 is the computer memory 51 which, inter alia, stores information derived from various received rf signals and the module's unique ID, location and time, whereby transmitted data or other information can be tagged to this particular module of the array of modules.

The accuracy and phase and frequency stability of the module 40 which enables applications based on a distributed array of modules is provided by an atomic clock circuit 54 which includes a small but highly reliable atomic clock oscillator, as will be subsequently described.

Operating potential for the apparatus is provided by an individual power supply 56, which may be a battery or other power source.

Figure 3A:
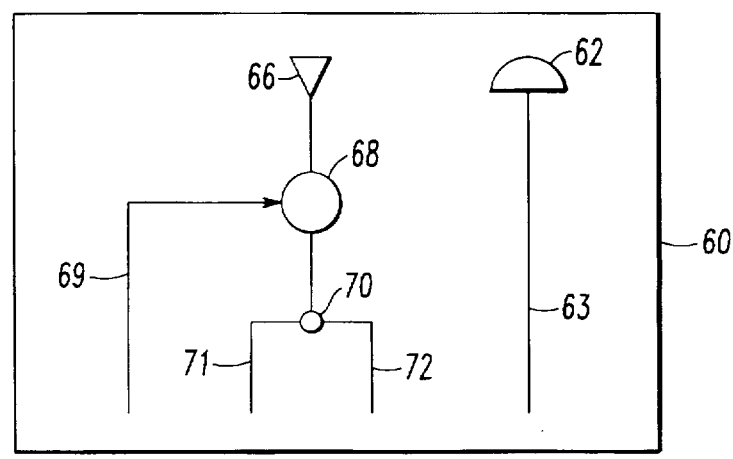
FIG. 3A is a view of the antenna unit of FIG. 3 in more detail.

The various signals, both GPS and rf are handled by an antenna unit 60, shown in more detail in FIG. 3A. In the embodiment of FIG. 3A the antenna unit 60 includes an individual GPS antenna 62 connected to GPS receiver 42 via line 63, and an individual rf antenna 66 connected to phase shifter 68, the latter being controlled by computer 50 via line 69. A circulator 70 receives rf signals to be transmitted via line 71 and directs received rf signals to the rf receiver 46 via line 72.

Figure 4:
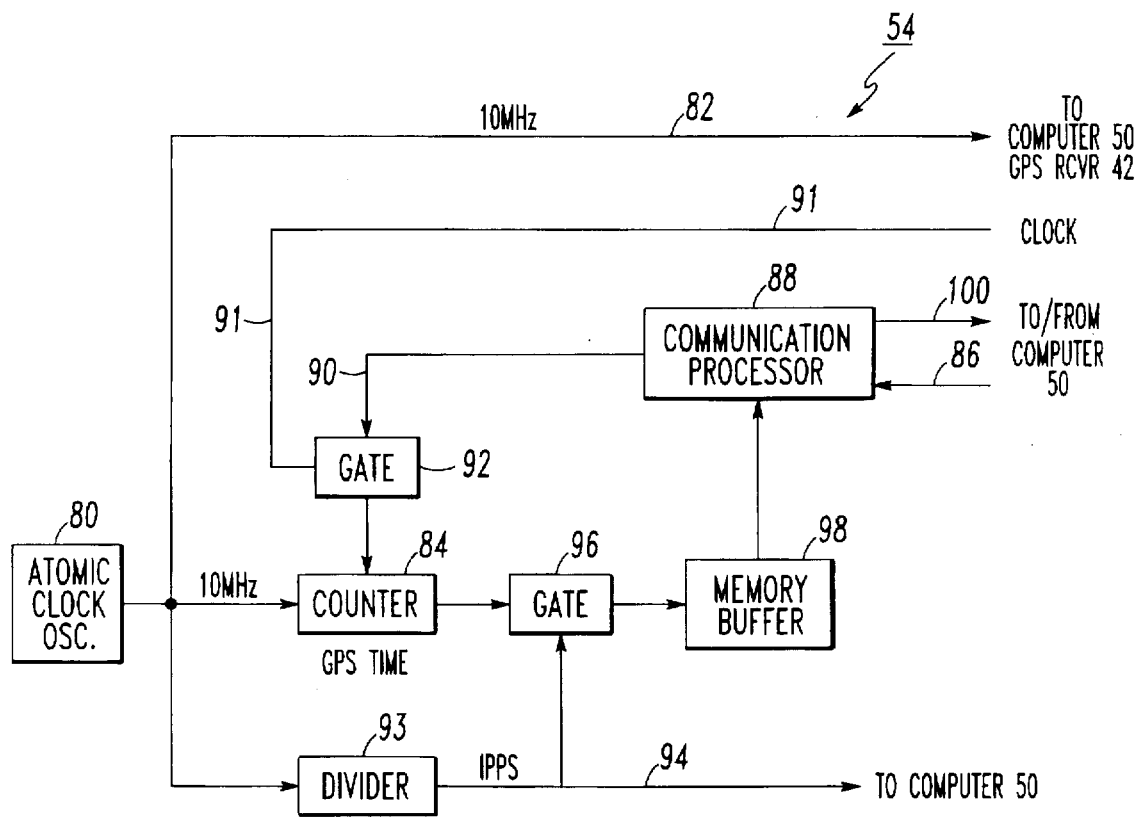
FIG. 4 is a block diagram of the atomic clock circuit of FIG. 3.

FIG. 4 illustrates the atomic clock circuit 54 in more detail. At the heart of the atomic clock circuit 54 is a highly phase stable atomic clock oscillator 80 having a frequency stability of $1 \times 10^{-11}$ or better and which is low in cost, small in size (about 1 in$^3$) and low in power requirements (about 300 milliwatts or less). An atomic clock oscillator meeting these criteria is more fully described in U.S. Pat. Nos. 5,192,105 and 5,327,105.

For purposes of illustration let it be assumed that the atomic clock oscillator 80 provides a highly stable output signal of 10 MHz. The actual frequency may be different depending upon the frequency synthesizer requirement for the rf transmitter and receiver components. This signal may be provided, on line 82, to the computer 50 as well as the GPS receiver 42 (FIG. 3) to function as a reference clock signal for their operation.

Within the atomic clock circuit 54, the 10 MHz oscillator signal is provided to a counter 84 which is used to keep track of GPS time. GPS time refers to the time standard to which the GPS constellation is synchronized. More particularly, the computer 50 compares the GPS time from GPS receiver 42 with the GPS time then stored in counter 80 and, as a result of the comparison, updates the counter 80, if required, so that over a period of time any inaccuracies in the GPS time from satellites 44 are averaged out and the atomic clock circuit 54, more particularly counter 84, provides an accurate representation of the actual GPS time. Such indication may be used to determine when a particular signal is received, when to transmit an rf signal or when to shut down in accordance with stored instructions and to compute time difference of arrival of rf signals, to name a few.

Upon start up, computer 50 provides an initial GPS time, in the form of an absolute count obtained from crystal oscillator controlled GPS receiver 42, to set the counter 84. This count is provided to atomic clock circuit 54 via input line 86 and to a data handler in the form of communication processor 88, which outputs the count via line 90. When a clock synchronizing signal, on line 91, is received by a gate circuit 92, counter 84 can be reset to the value provided by the communication processor 88. The clock synchronizing signal can be a 1 pulse per second (pps) signal generated by the GPS receiver. Counter 84 is incremented at a 10 MHz rate by the output of atomic clock oscillator 80. The running count stored in counter 84 is transmitted back to the computer 50 every second so that the comparison with GPS time from receiver 42 may be made. To transmit the count back to the computer 50, there is provided a divider circuit 93 which derives a 1 pps signal on line 94 from the 10 MHz signal of atomic clock oscillator 80. Every second this signal from divider circuit 93 opens a gate circuit 96 to allow transfer of the then running count to a memory buffer 98 where it is sent to the computer via communication processor 88 and output line 100.

The 1 pps signal on line 94 from divider 93 is also provided to computer 50 to let it know precisely when a count is being transferred.

With each module 40 having the capability of accurately determining its exact location and being able to transmit and receive rf signals, the modules may be dispersed in an array for surveillance and other purposes. When in a deployed array the modules may be operated in a variety of modes dependent upon the mission.

Figure 5A:
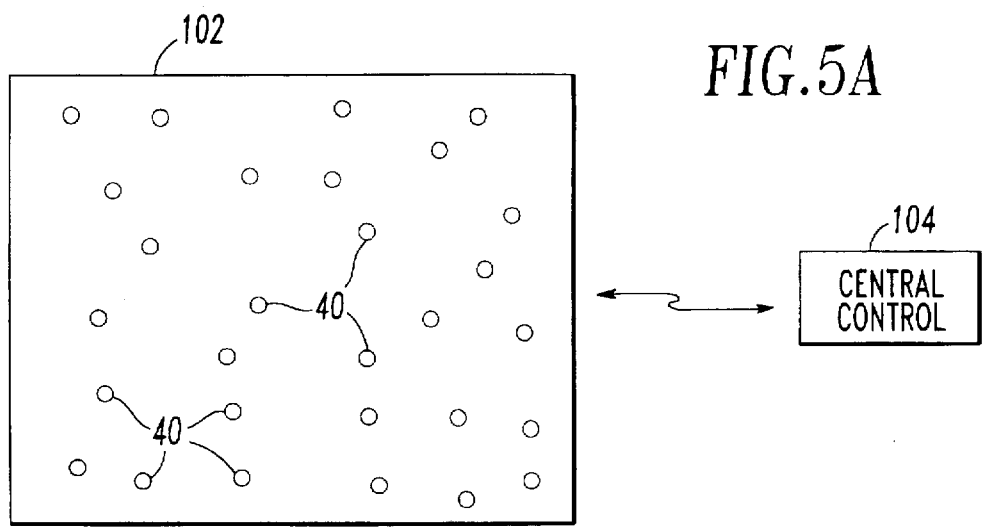
FIGS. 5A to 5E serve to illustrate different operating modes of the modules of FIG. 3.

In one mode of operation, and as illustrated in FIG. 5A, modules 40 of array 102 are programmed to communicate with a central control station 104 which is remote from the array 102. Each module 40 will upon command from the central control 104, or at a preassigned time, transmit its precise location to the central control 104. The modules 40 may be commanded to gather and store rf signal information from a particular direction or directions determined by phase shift commands and to subsequently transmit the stored information back to the central control 104 for post processing. Post processing may be performed, for example, to obtain an image from the rf information collected.

Figure 5B:
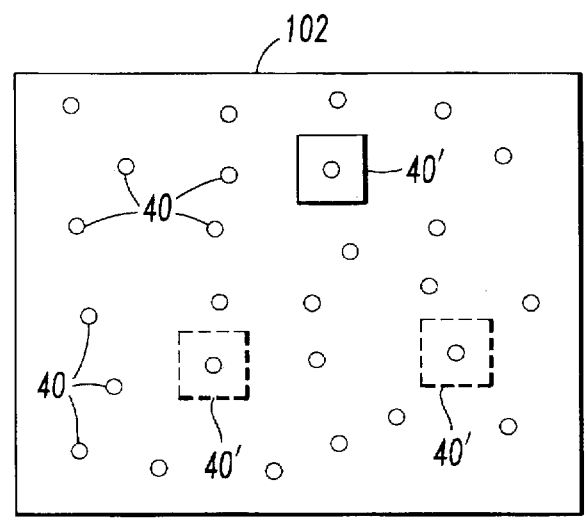

In another mode of operation, and as illustrated in FIG. 5B, the array may be deployed at a location out of communication range of friendly forces. In such instance, a selected module 40' may be programmed to function as the central control. In addition, this central control function may be shared with other modules, as indicated by the dotted blocks, in which instance the vulnerability to attack is reduced by the dispersion.

Figure 5C:
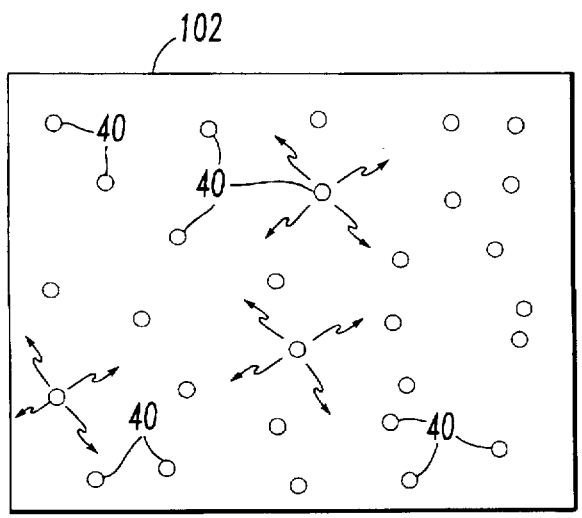

For some operations, and as indicated in FIG. 5C, the modules of array 102 may be completely autonomous with respect to a central control. In this mission scenario each module 40 communicates its location to all of the other modules of array 102 and each module will, for example, transmit a certain signal at a time, or times, determined by its calculated location relative to the other modules, and in accordance with a program stored in its computer prior to the mission. The autonomous operation of the array 102 in FIG. 5C represents a powerful mode of operation. The complexity of the mission in this scenario will dictate the size of the memory 51 incorporated in the modules.

Figure 5D:
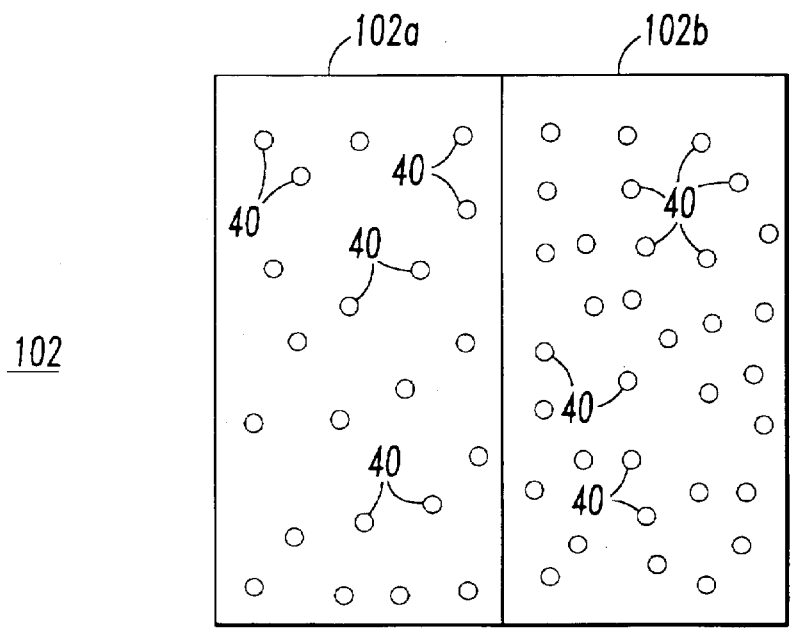

FIG. 5D serves to illustrate that the modules 40 may be instructed to operate such that the array 102 is divided into two adjacent subarrays 102a and 102b. In this manner a blinking signal can be generated by alternate transmission from each subarray 102a and 102b, or the modules of one subarray can collectively act as a phased array transmitter while the modules of the other subarray can collectively act as a phased array receiver.

Figure 5E:
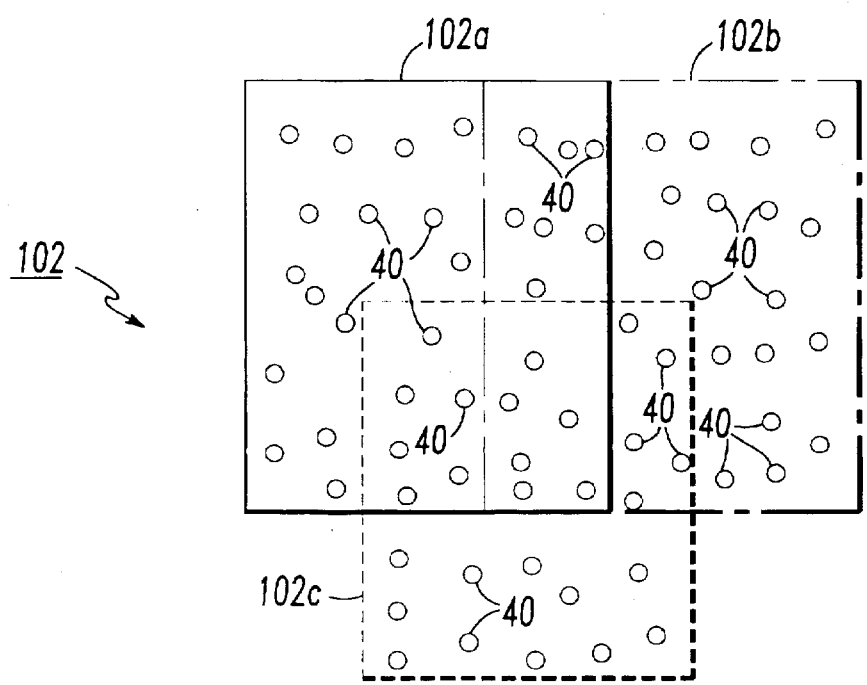

FIG. 5E illustrates an array 102 consisting of a plurality of overlapping subarrays. Three subarrays 102a, 102b and 102c are shown by way of example and selected modules 40 may be common to more than one subarray, depending upon their use and programming.

Figure 6B:
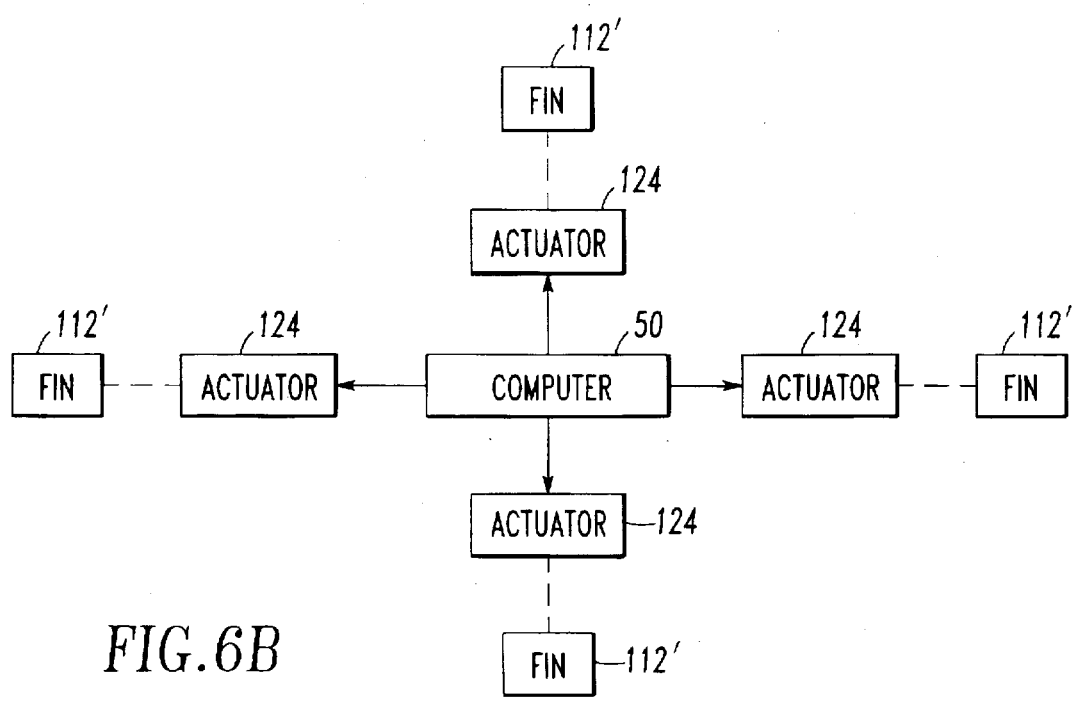
FIG. 6B illustrates one embodiment for the control of the movable fins shown in FIG. 6A.
Figure 6:
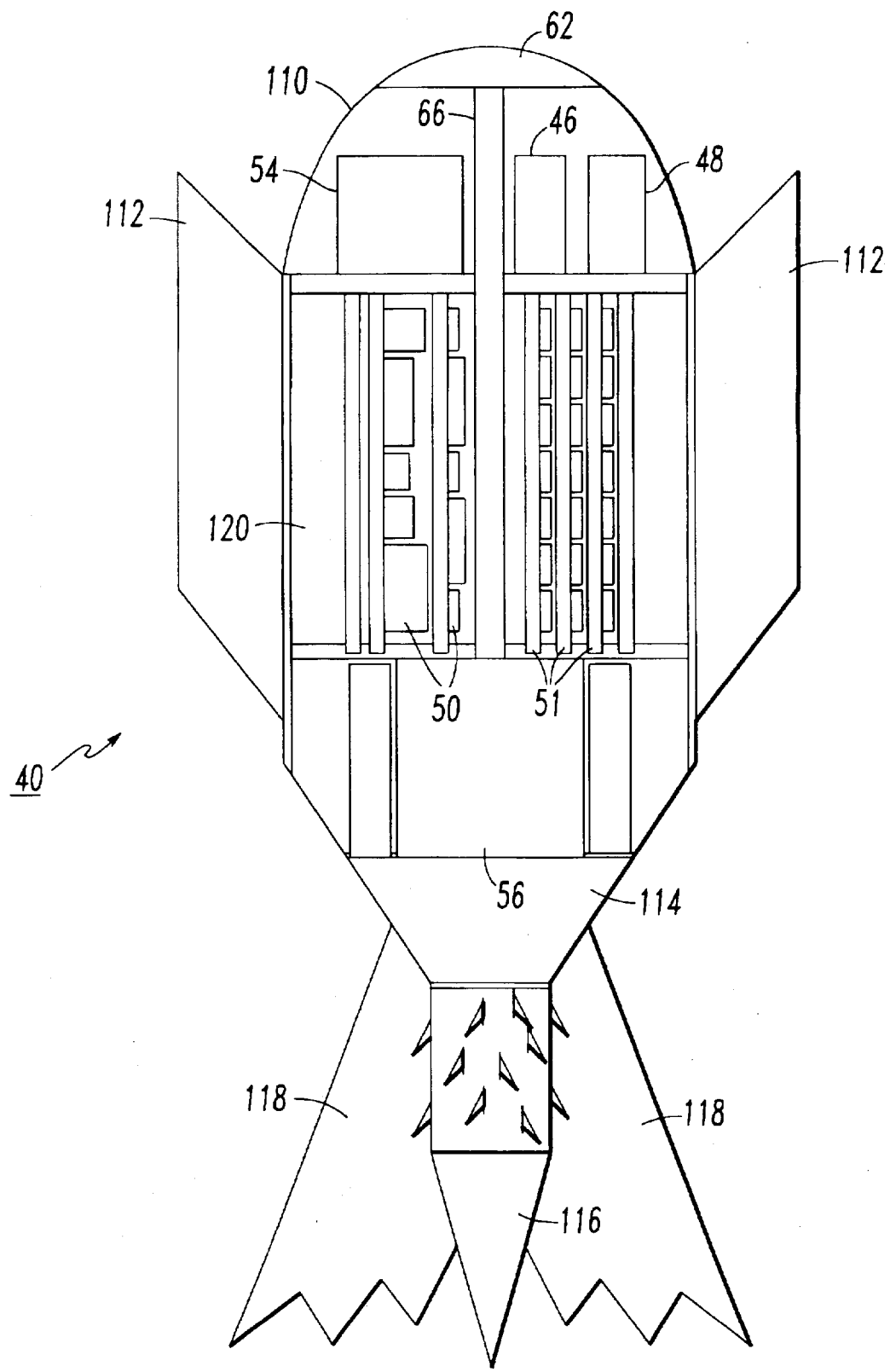
FIG. 6 illustrates a bomblet for dispersing the module into a region to be surveilled.

The modules 40 may be placed in a region to be surveilled by any one of a number of means. They may be placed in a predetermined area by a covert force, however under battlefield conditions to minimize risk to friendly forces, the modules may be deployed by missile or may be air dropped, by way of example. FIG. 6 illustrates, a module 40 which is air dropable.

The components of the module 40 previously described in FIGS. 3 and 3A, are contained in a bomblet housing 110 having a plurality of fixed stabilizing fins 112. The power source 56 and weight 114 in the lower portion of housing 110 aids in maintaining the housing in the intended vertical orientation with the antenna unit pointed upwards, just prior to contact with the ground after deployment from an aircraft.

The lower portion of the housing 110 also includes a ground penetrating spike 116 and dampers 118 which may be of a sponge rubber consistency to moderate the penetration as the spike 116 enters the ground. In addition, the interior of the housing 110 may include an elastomeric material 120 to act as a shock absorber for the module components.

With the relatively small size of the atomic clock circuit 54 and utilizing integrated circuit components, it is postulated that the housing 110 will have a length of approximately 6 inches (excluding the spike 116) and a diameter of approximately 3 inches, to accommodate the power supply 56 which will last approximately one week or longer.

Figure 6A:
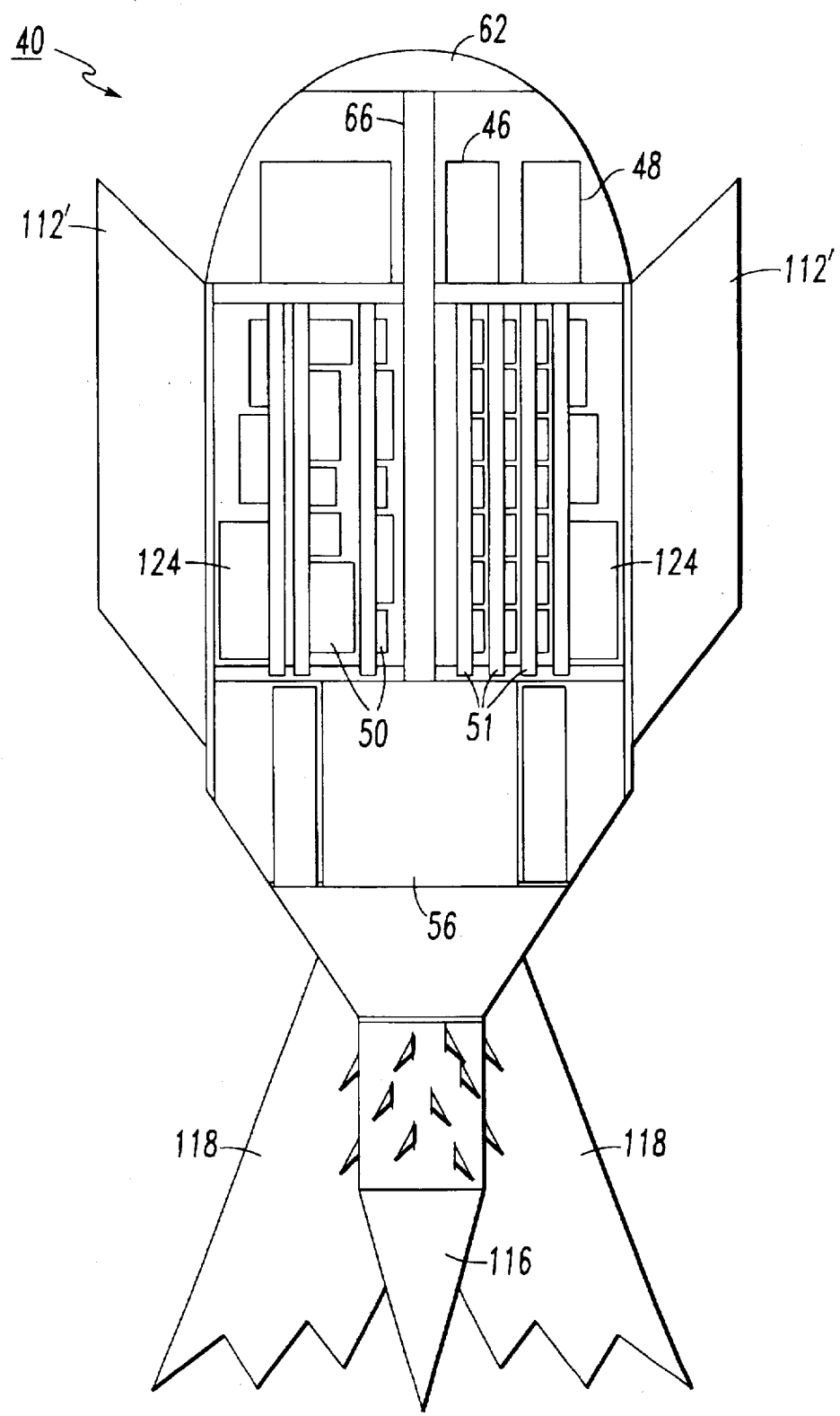
FIG. 6A illustrates an alternate bomblet with movable fins for accurate deployment into a region to be surveilled.

FIG. 6A illustrates a "smart bomblet" modification of the apparatus of FIG. 6 whereby the module may be deployed with a greater degree of accuracy. In the embodiment of FIG. 6A, the fins 112' are rotatable about a horizontal axis and are moveable by means of respective actuators 124. With additional reference to FIG. 6B, which illustrates four fins 112', each module is assigned a respective predetermined known location on the ground prior to deployment. If the modules can land in or near the known location, then the quality of beams produced by the modules may be improved and the computation time for certain operations may be reduced. The modules are turned on before being dropped from the aircraft. As they descend through the air, the present position, as determined by the GPS portion of the module, is compared, by the computer 50, with the final desired position stored in its memory 51. The difference in positions is utilized to drive the respective actuators 124 to turn the fins 112' so as to steer the housing 110 toward the desired landing spot.

Figure 7A:
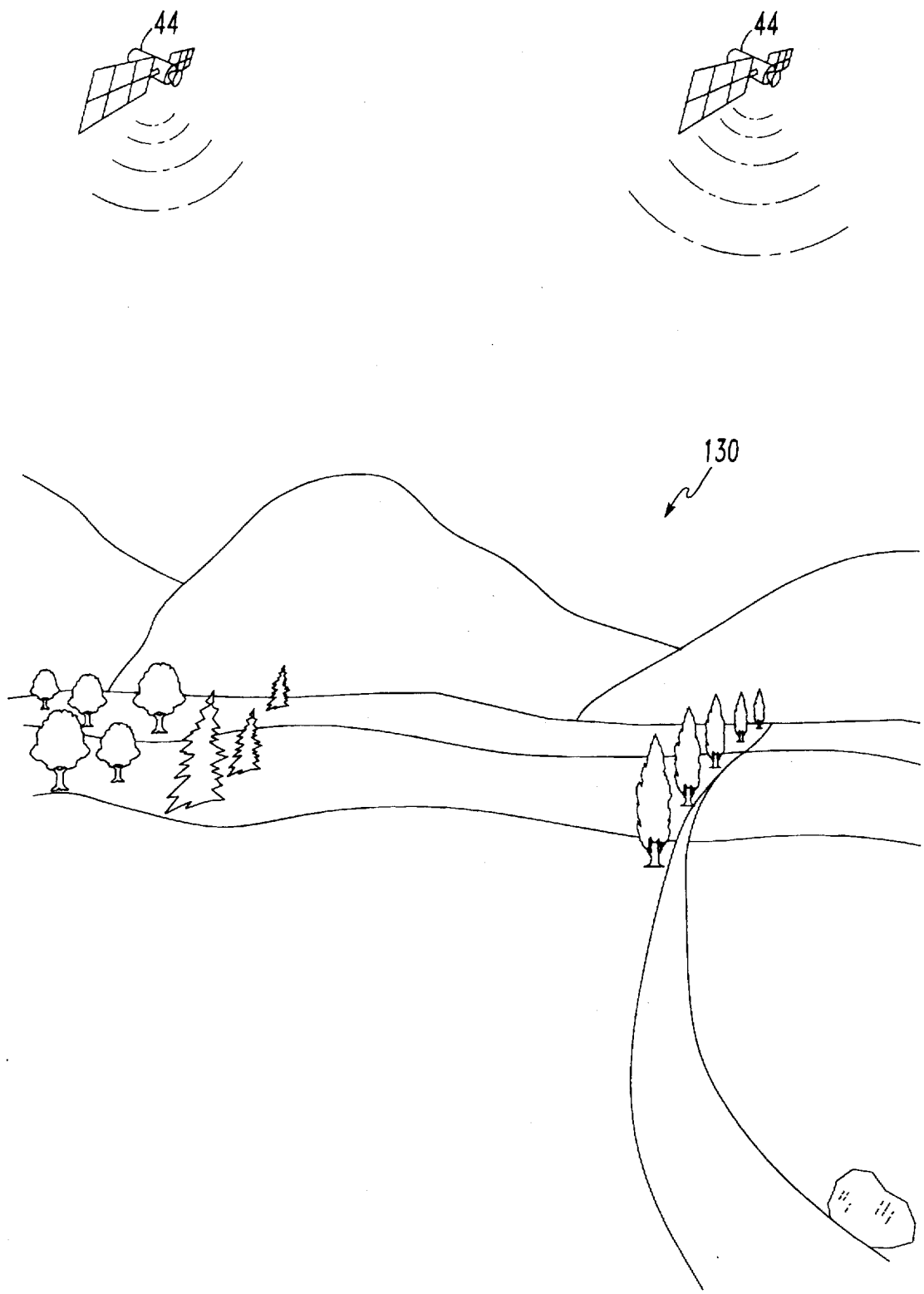
FIGS. 7A to 7D illustrate a typical scenario for which the present invention may be used.

FIGS. 7A to 7D illustrate a scenario utilizing air dropped modules as described with respect to FIGS. 6 or 6A. In FIG. 7A numeral 130 represents a region selected to be under surveillance and having in view a number of GPS satellites 44.

Figure 7B:
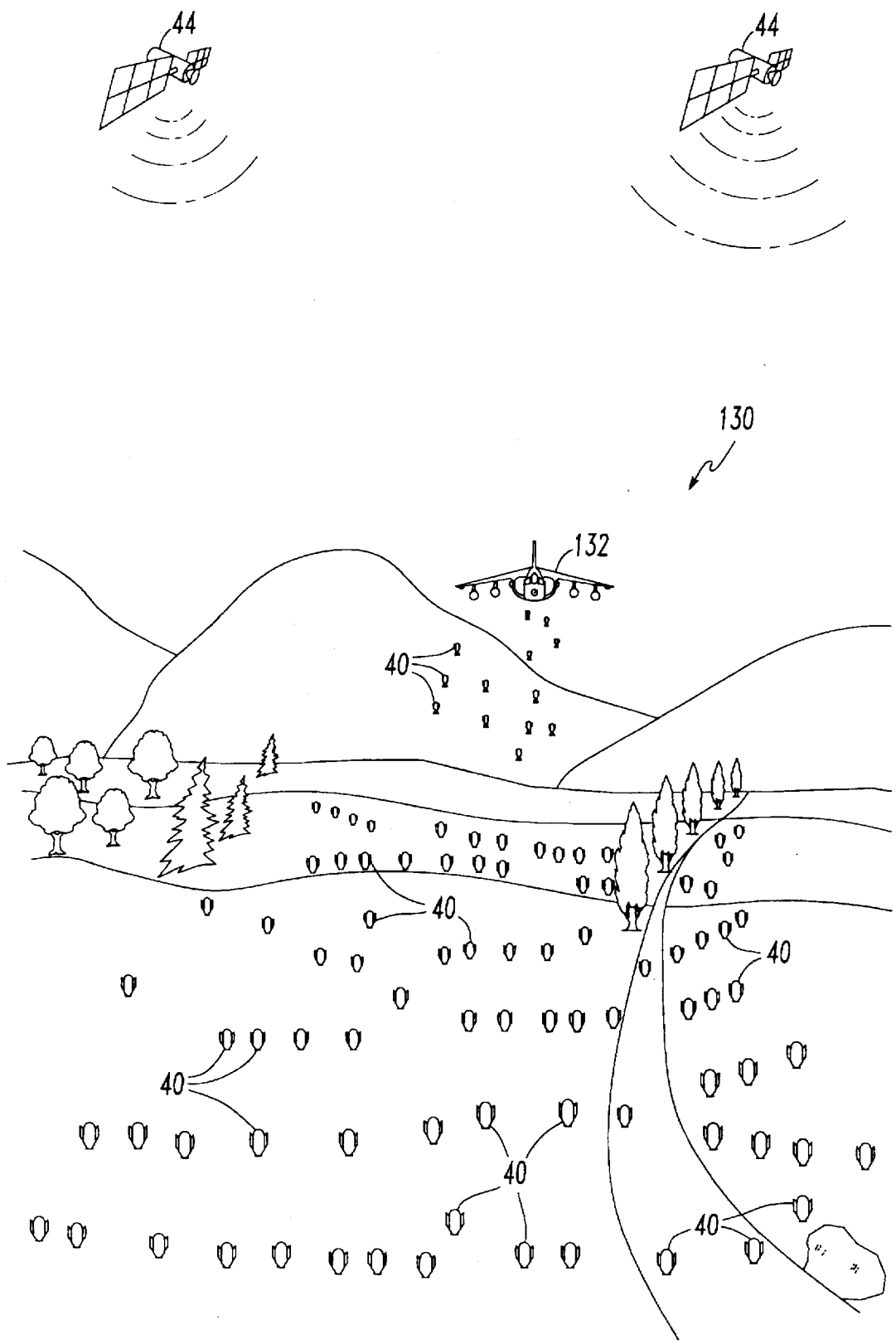
Figure 7C:
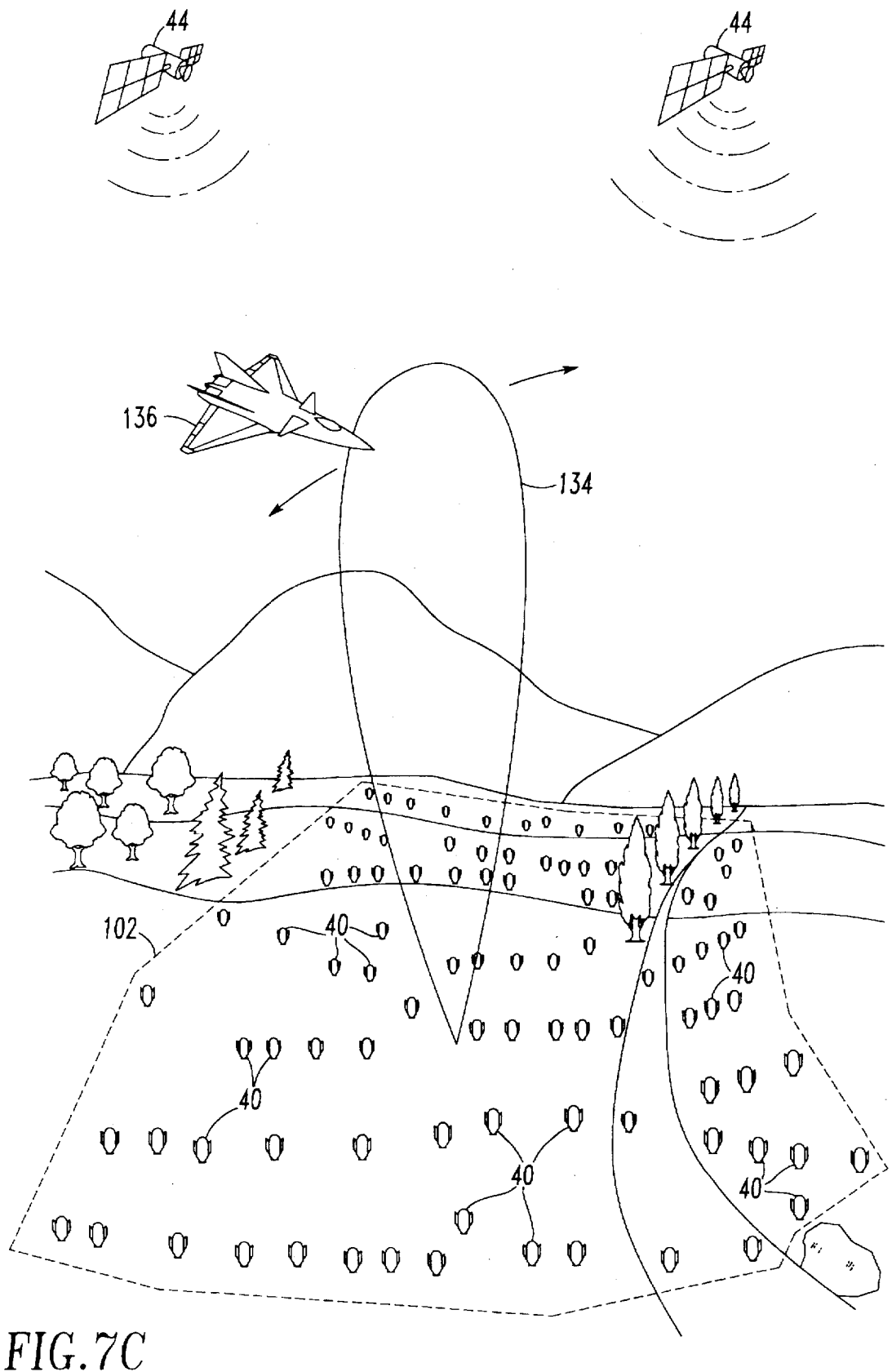

In FIG. 7B, an aircraft 132 is seen as dispensing the modules over the terrain in region 130 whereupon they penetrate into the ground and form an array. The array 102, seen in FIG. 7C, is operational to form a scanning beam 134 (or multiple beams) for searching for airborne targets such as aircraft 136. Operation of the individual modules to transmit at the precise moment relative to the other modules for forming the scanning beam 134 is governed by the module's computer which is commanded by a central control such as described in FIGS. 5A or 5B, by way of example. Likewise, the reception of target returns is collectively processed as governed by the same central control.

Figure 7D:
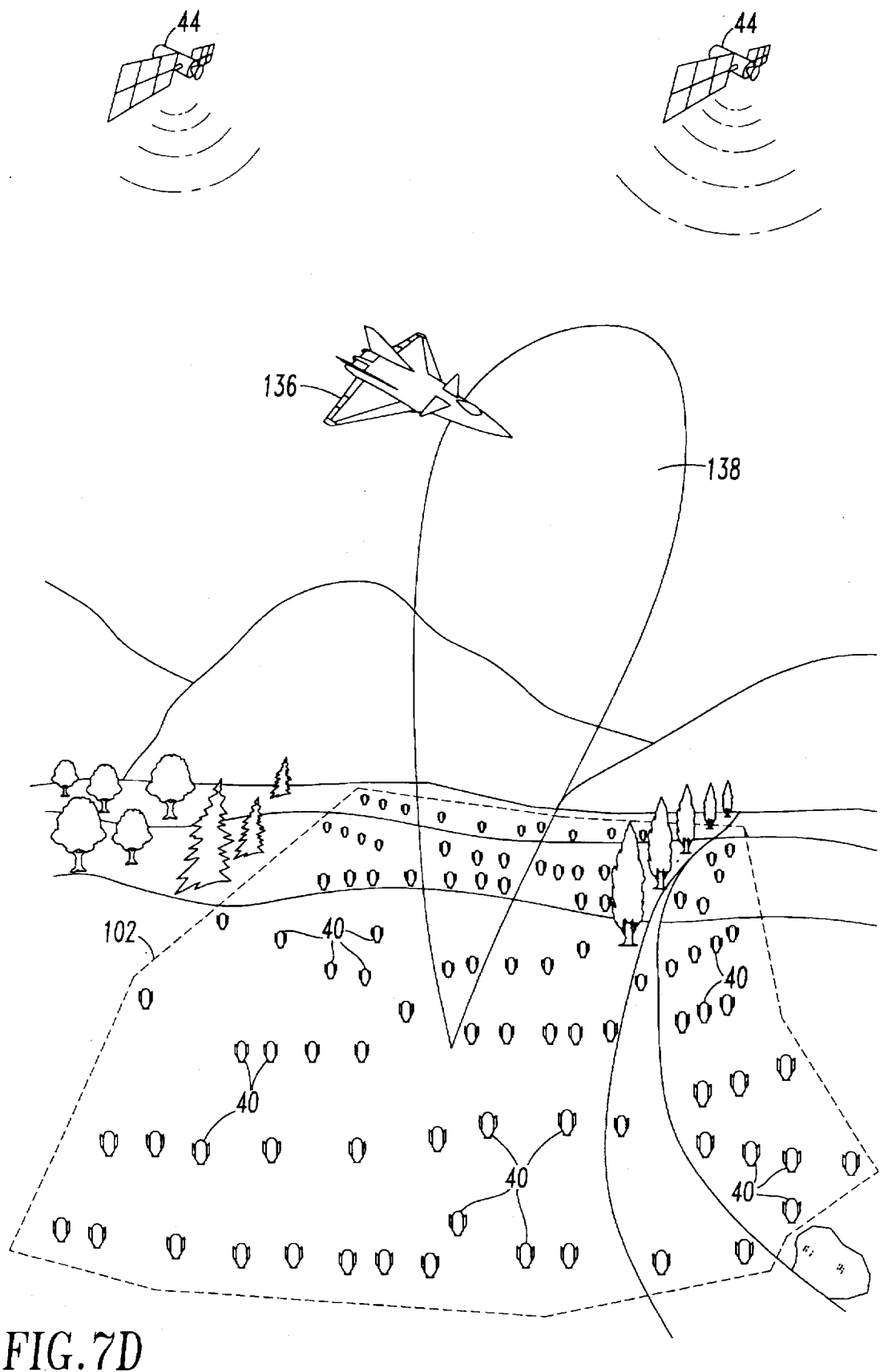

With the deployed array 102 forming a relatively wide aperture compared to the operating wavelength λ, the detected target aircraft 136 may be imaged by forming a narrow beam 138 through which the target aircraft relatively moves. In the case of FIG. 7D, the narrow beam 138 is stationary and the aircraft moves through it. If an identification of the aircraft can be made from the imaging, then an appropriate action may be undertaken. For example, the information relative to target identification may be communicated to a missile launching site for appropriate action. As an alternative, if the identification reveals a target known to have a GPS system for navigational purposes, the array can then be commanded to produce GPS jamming signals thereby denying the aircraft necessary navigational information.

Figure 8:
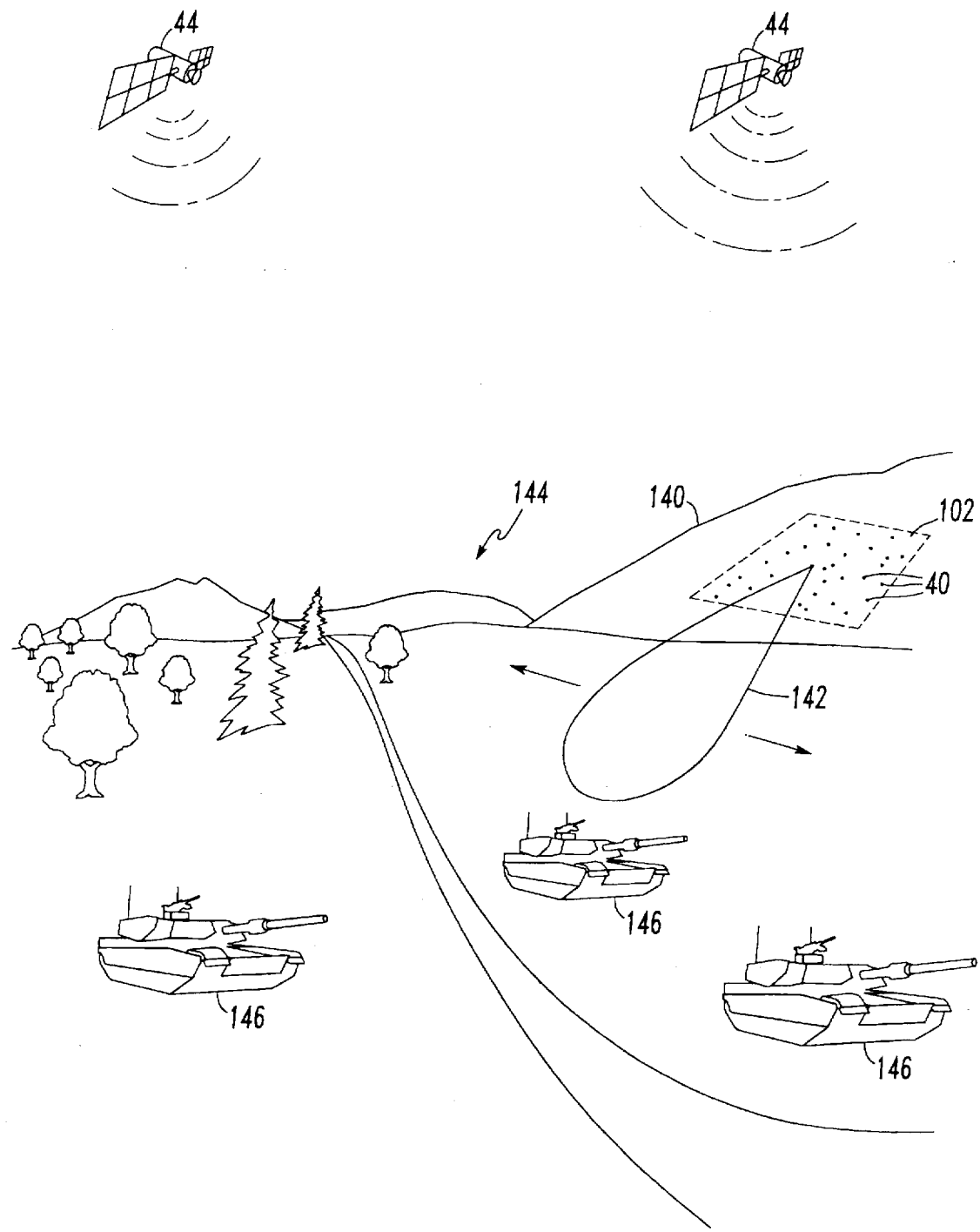
FIG. 8 illustrates another scenario.

As another potential scenario, FIG. 8 illustrates the array of modules 102 deployed on a hillside 140 for forming a somewhat horizontal scanning beam 142 to detect ground targets such as tanks 146. Once detected, appropriate action as previously described with respect to FIG. 7D may be undertaken.

In addition to detection, imaging, communications and GPS or other signal jamming operations, the present invention is capable of GPS spoofing. That is, the apparatus, with minor modification, can simulate actual GPS signals but with incorrect information, to confuse enemy GPS receivers.

An actual GPS signal transmitted by a satellite consists of two distinct spread spectrum signals that contain two different codes, one known as the coarse acquisition (C/A) code, at a rate of 1 MHz, and the other as the precision (P) code at a rate of 10 MHz. A navigation message containing information used for determining location is transmitted at a rate of 50 Hz. The C/A code is transmitted only on a carrier signal known as $L_1$, centered at 1575.42 MHz, and the P code is transmitted on a carrier signal known as $L_2$, centered at 1227.60 MHz, in addition to the $L_1$ carrier signal.

Figure 9:
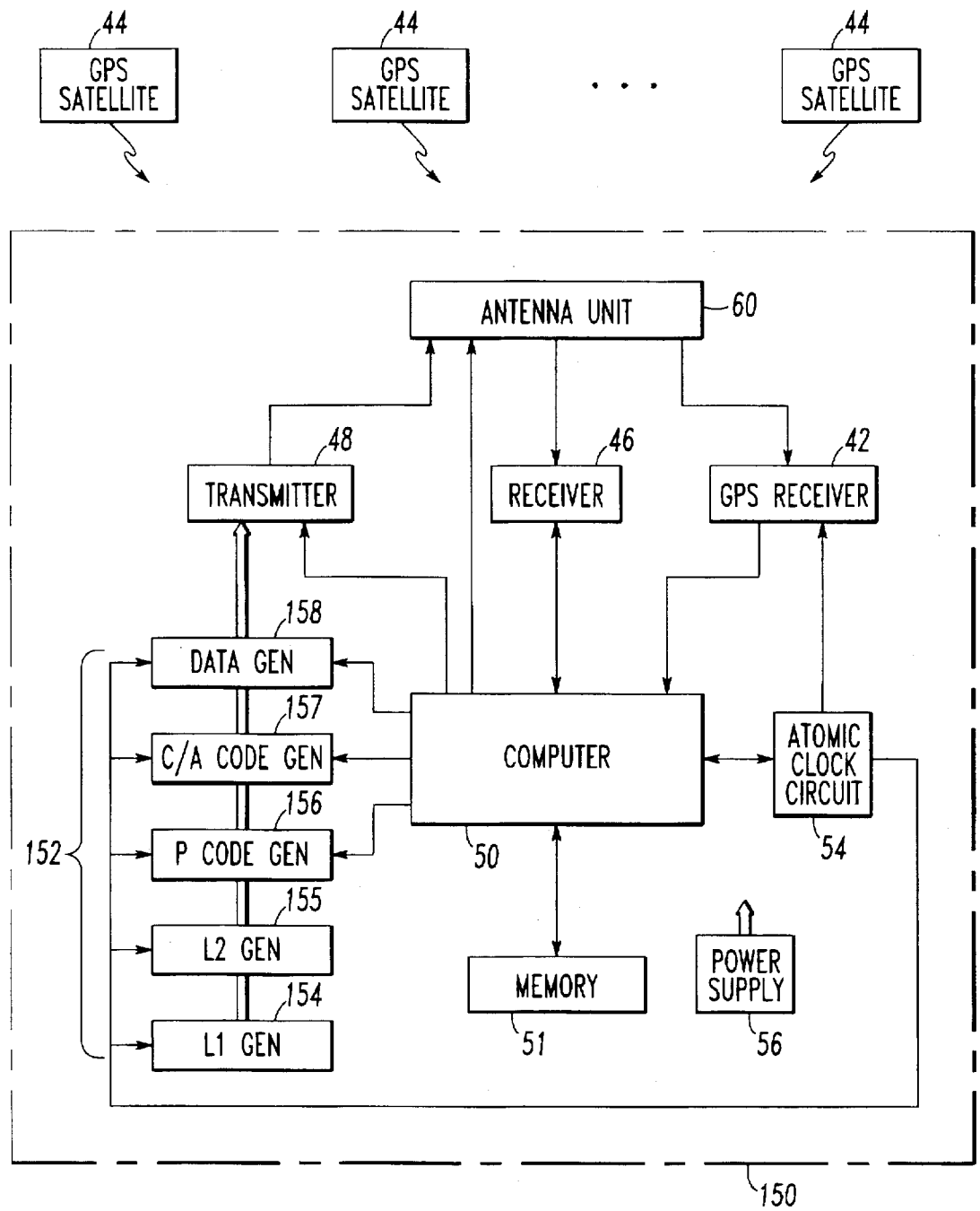
FIG. 9 is a block diagram of a module in accordance with another embodiment of the invention.

FIG. 9 illustrates a module 150 which is operable to additionally function as a GPS spoofer. Module 150 includes the circuitry previously described in FIG. 3 as well as circuit means 152 for generating GPS signals, including false signals. More particularly, circuit means 152 includes $L_1$ and $L_2$ oscillators, or frequency synthesizers, 154 and 155 for providing the simulated satellite carrier frequencies. The P and C/A codes are respectively supplied by P code and C/A code generators 156 and 157 with the code sequences being selected by computer 50. False Satellite information to be transmitted by transmitter 48 is provided by a data generator 158, which receives the false data to be transmitted from computer 50.

All of the circuits 154 to 158 are precisely controlled in frequency by virtue of receiving the stable output from atomic clock oscillator 80 (FIG. 4) within atomic clock circuit 54.

Once having been deployed, an array of modules 150 can operate as an autonomous array, as in FIG. 5C and/or in subarrays, as in FIG. 5D or 5E to spoof enemy GPS equipment in a selected region. Conversely, modules 150 may be controlled by a central control, as in FIGS. 5A or 5B, to commence spoofing operations, either collectively or in predetermined groups, once a particular target has been detected and/or identified.

Figure 10:
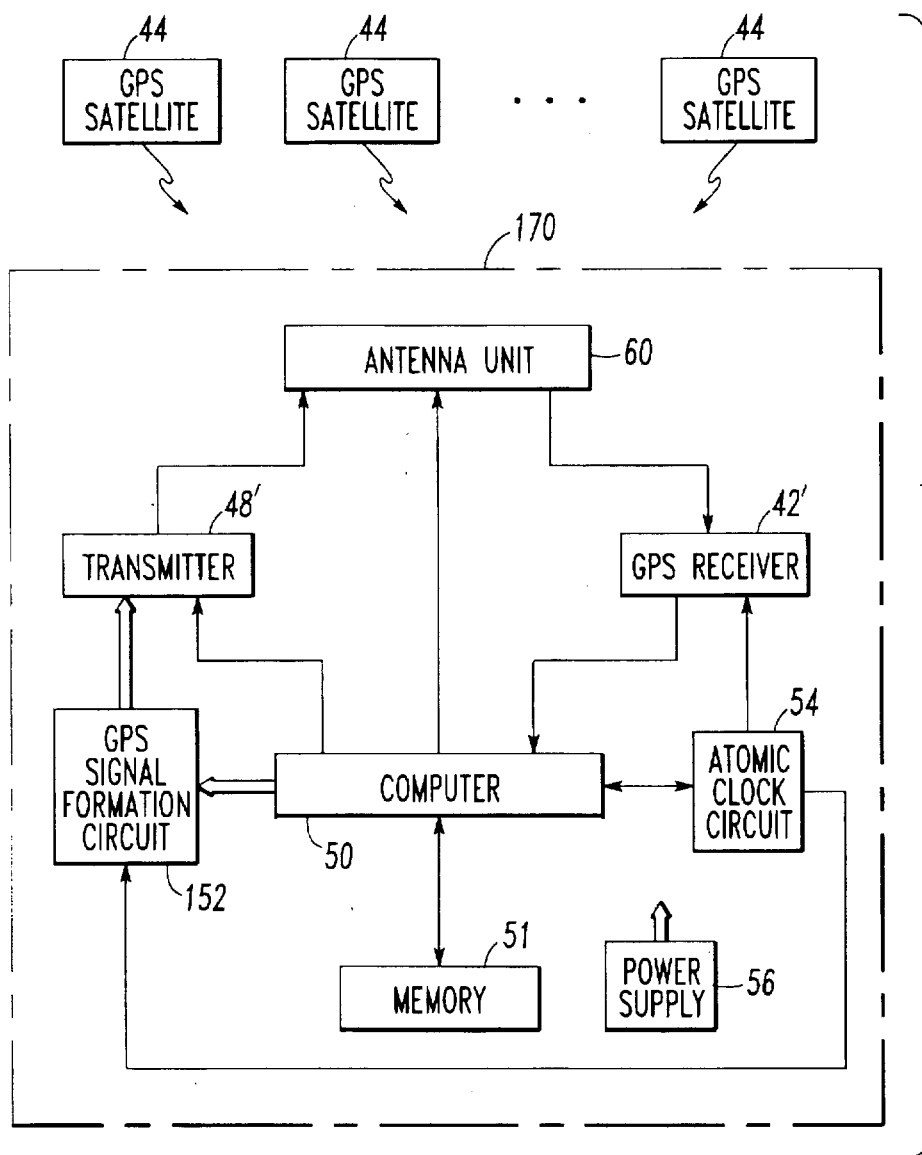
FIG. 10 is a block diagram of an embodiment of the invention which utilizes a single receiver.

FIG. 10 illustrates an embodiment of the invention, as in FIG. 3, however with utilizing only one receiver and using only the frequency set of the satellite navigation system. More particularly, module 170 includes a single GPS receiver 42' which is operable, as before, to provide computer 50 with time and location information. In addition, receiver 42' supplies the navigation message to computer 50 which then determines whether the message is from an actual satellite 44. If not from an actual satellite, then the computer treats the message as information from another source, to be processed. Such other source may be another module, a command from a central control or a signal return, by way of example.

Information to be transmitted is handled by transmitter 48' which is constructed and arranged to transmit on the frequency set used by the satellite and receiver 42', and which may be provided by circuit 152, as in FIG. 9. In the case of a GPS system, transmitter 48' will transmit on the $L_1$ or $L_2$ frequencies of the GPS system.

Figure 10A:
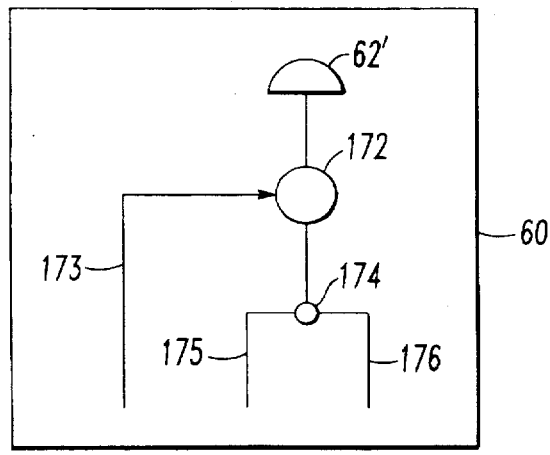
FIG. 10A is a view of the antenna unit of FIG. 10 in more detail.

For the module of FIG. 10, the antenna unit 60, as seen in more detail in FIG. 10A, includes a single omnidirectional GPS antenna 62', connected to phase shifter 172, the latter being controlled by computer 50 via line 173. A circulator directs signals from transmitter 48' to antenna 62' via line 175, and directs received signals to receiver 42' via line 176.

Accordingly with the arrangement of FIG. 10, the module, by operating only on the satellite navigation system frequencies can eliminate the requirement for an additional receiver. Although imaging capabilities may be degraded because of this frequency limitation, an array of modules 170 can satisfactorily perform desired other functions such as detection and GPS signal jamming, by way of example.

Although the present invention has been described with a certain degree of particularity, it is to be understood that various substitutions and modifications may be made without departing from the spirit and scope of the invention as defined in the appended claims.

What is claimed is:

1. A distributed phased array antenna system, comprising:
    (A) an array of autonomous modules for deployment in a region to be surveilled;
    (B) each said module including i) at least a first receiver for receiving signals from a satellite navigation positioning system and for generating in response thereto at least, a time signal as well as position signals indicative of the exact location of said module, ii) a transmitter for transmitting rf signals, iii) an atomic clock circuit including an atomic clock oscillator operable to provide a stable phase and precise frequency clock signal, iv) a computer having an associated memory for storing, at least, operational commands, the ID of said module, and indications of received rf signals, said computer being operable to execute operational commands and to perform predetermined computations for governing operation of said module including providing said transmitter with signals to be transmitted, v) an individual power supply and vi) an antenna unit coupled to said receiver and said transmitter;
    (C) said modules of said array being operable in a selected mode of operation which includes i) communication with a central control or ii) independent communication without said central control.

2. A system according to claim 1 wherein:
    (A) said modules of said array are operable in a selected mode of operation which includes communication with a central control;
    (B) said central control being at a location distant from said array.

3. A system according to claim 1 wherein:
    (A) said modules of said array are operable in a selected mode of operation which includes communication with a central control;

(B) said central control being constituted by at least one of said modules of said array.

4. A system according to claim 1 which includes:
(A) a first receiver for receiving signals from a satellite navigation positioning system and for generating in response thereto at least, a time signal as well as position signals indicative of the exact location of said module; and
(B) a second receiver for receiving rf signals and providing said received rf signals to said computer.

5. A system according to claim 1 wherein:
(A) said signals from said satellite navigation system are transmitted over a predetermined frequency set and includes a navigation message;
(B) said module includes only a single receiver, said single receiver being operable to receive signals from said satellite navigation positioning system to generate in response thereto, and to pass on to said computer, a time signal, position signals indicative of the exact location of said module, and said navigation message;
(C) said transmitter being operable to transmit signals at one or more frequencies contained in said frequency set.

6. A system according to claim 1 which includes:
(A) an air dropable housing;
(B) said module being contained within said air dropable housing.

7. A system according to claim 1 wherein:
(A) said housing includes a weight at a lower portion thereof.

8. A system according to claim 1 wherein:
(A) said housing includes a spike at the lower end thereof for penetration into the earth.

9. A system according to claim 1 wherein:
(A) said housing includes a set of fins thereon.

10. A system according to claim 9 wherein:
(A) said fins are moveable about a horizontal axis to guide said housing along a selected path when dropped.

11. A system according to claim 4 wherein:
(A) said antenna unit includes an rf antenna for transmitting and receiving said rf signals and a separate antenna for receiving said signals from said satellite navigation positioning system.

12. A system according to claim 5 wherein:
(A) said antenna unit includes a single antenna for receiving said signals from said satellite navigation positioning system and for transmitting said rf signals.

13. A system according to claim 1 wherein:
(A) said atomic clock circuit includes circuit means for storing a time signal; and wherein
(B) said computer is operable to periodically compare said stored time signal with said time signal provided by said navigation positioning system and to adjust said stored time signal in accordance with any difference resulting from said comparison.

14. A system according to claim 1 wherein:
(A) each said module additionally includes circuit means for simulating and transmitting signals similar to said signals provided by said navigation positioning system.

* * * * *